Patented July 4, 1950

2,513,654

UNITED STATES PATENT OFFICE 2,513,654

RECOVERY OF ALKYLLEAD COMPOUNDS

Ivar T. Krohn, Southfield Township, Mich., assignor to Ethyl Corporation, New York, N. Y., a corporation of Delaware No Drawing. Application November 16, 1948, Serial No. 60,391

9 Claims. (Cl. 202—57)

This invention relates to a method for recovery of alkyllead compounds from the reaction products accompanying their synthesis. More specifically, it relates to an improved method of steam distilling an alkyllead compound in the presence of other reaction products during its manufacture.

As is well known tetraethyllead is made by the reaction of ethyl chloride with an alloy of sodium and lead. The alloy contains a substantial excess of lead and thus the products contain considerable unreacted lead, as well as tetraethyllead, sodium chloride and small amounts of unreacted sodium and ethyl chloride. This mixture, hereinafter referred to as "reaction mass," is a mass of finely divided solids containing substantial quantities of normally liquid tetraethyllead.

Steam distillation is used to recover the tetraethyllead product from the reaction mass. The reaction mass is discharged into a still which is already partly full of water. The mixture is agitated continuously while steam is passed through the still. The mixture in the still termed "still sludge," tends to agglomerate forming a spongy porous mass in the shape of "balls" or a solid metallic formation. The solid metallic formation usually occur as sheets or rings around the interior of the still. Such agglomeration cause considerable trouble such as overloading and jamming of the agitator, making removal of still sludge difficult and in severe cases necessitating shutting down and cleaning out the still. The latter is a difficult task requiring unusual safety precautions due to the toxic nature of the tetraethyllead.

Also the overall yields of tetraethyllead are adversely affected by such still troubles. When a distillation is interrupted or discontinued as above described, the tetraethyllead left in the still sludge is not completely recovered in subsequent operations and a loss of product results.

Still additives, commonly referred to as "still aids" have been added to the steam distillation step to minimize such still troubles but none, prior to my invention, have been nearly as efficient as mine.

It is therefore an object of this invention to provide an improved still aid which greatly reduces the difficulties encountered during distillation which are caused by the agglomeration of solid reaction products. Another object is to obtain a better recovery of alkyllead products. A further object is to improve the safety and working conditions for the process.

I accomplish these objects by conducting the steam distillation used for separating alkyllead products from reaction mass, in the presence of a dilute solution of a soluble iron salt.

The iron salts used as still aids in my invention are soluble salts of either organic or inorganic acids. The iron in the salt may be either ferrous or ferric. Particularly, I have found the nitrates, chlorides, sulfates and lactates of iron to be effective. Ferrous sulfate is especially effective and is economical since it is made from a metallurgical waste product. Also mixed or double salts such as ferric ammonium oxalate are effective.

The agglomerative tendency of the reaction mass varies with the alkyllead compound being steam distilled, the character of the reaction mass and the operating conditions under which the reaction mass is formed. As the agglomerative tendency of the reaction mass varies in character and severity, the degree of effectiveness of a given quantity of the iron compound in reducing still troubles varies. In general, effectiveness is a function of the iron content of the salt. Concentration is expressed herein as the iron content of the iron salt in per cent by weight of the lead contained in reaction mass. I have found that it is preferably to use the iron salt in concentrations between 0.06 to 0.12 per cent by weight of the lead present. This amount of iron salt on the average reduces by 70 to 80 per cent the still troubles encountered without the benefit of one of my still aids. However, some benefit is obtained even when the weight of the iron in the still solution is as low as 0.01 per cent by weight of the lead in the reaction mass. When the concentration of the iron salt is between 0.01 and 0.06 per cent by weight, the effectiveness averages about 30 to 40 and approaches an effectiveness of 60 per cent at the higher concentration within this range. I have found that little additional benefit is obtained at concentrations above 0.12 per cent by weight of the lead in the reaction mass.

To further illustrate my invention, a commercial scale embodiment of the invention was carried out as follows: about 3100 pounds of water was charged to a steam still and 7.5 pounds of ferric chloride was added and dissolved. The ferric chloride was weighed as the hexahydrate ($FeCl_3 \cdot 6H_2O$). The still agitator was started and a charge of 4500 pounds of reaction mass was fed to the still. The reaction mass contained about 2500 pounds of predominantly lead particles, about 1100 pounds of tetraethyllead, and roughly 900 pounds of sodium chloride. Open steam was passed through the charge for a period of 90 to 120 minutes, which was adequate for substantially complete removal of the tetraethyllead from the reaction mass. There was no distillation trouble caused by agglomeration of the predominantly lead particles during this distillation. The above operation was repeated many times with little or no distillation trouble. In contrast, when this procedure was repeated in the absence of a still aid, difficulty was encountered in every instance. My invention is not limited to a process for the recovery of tetraethyllead but it is applicable to improving the recovery by steam distillation of other alkylleads such as tetraethyllead, tetrapropyllead, dimethyldiethyllead, and trimethylphenyllead.

Thus by the use of my invention the difficulties encountered during steam distillation of alkyllead products are substantially reduced.

I claim:

1. The process of separating by steam distillation an alkyllead from the reaction products accompanying its synthesis comprising conducting said distillation in the presence of an aqueous solution of an iron salt.

2. The process of claim 1 further defined in that the soluble iron salt comprises a sulfate of iron.

3. The process of claim 1 further defined in that the soluble iron salt comprises a nitrate of iron.

4. The process of claim 1 further defined in that the soluble iron salt comprises a chloride of iron.

5. The process of separating by steam distillation an alkyllead from the reaction products accompanying its synthesis comprising conducting said distillation in the presence of an aqueous solution of an iron salt containing iron equivalent to from 0.01 to 0.12 weight per cent of the lead contained in the reaction products.

6. The process of separating by steam distillation an alkyllead from the reaction products accompanying its synthesis comprising conducting said distillation in the presence of an aqueous solution of an iron salt containing iron equivalent to from 0.06 to 0.12 weight per cent of the lead contained in the reaction products.

7. The process comprising separating by steam distillation tetraethyllead from the reaction products accompanying its synthesis in the presence of an aqueous solution of an iron salt containing iron equivalent to from 0.06 to 0.12 weight per cent of the lead contained in the reaction products.

8. In the process of preparing tetraethyllead by reacting sodium-lead alloy and ethyl chloride, and recovering tetraethyllead from the products of reaction accompanying its synthesis, the step of steam distilling tetraethyllead therefrom in the presence of an aqueous solution of a sulfate of iron containing iron equivalent to from 0.06 to 0.12 weight per cent of the lead contained in the products of reaction.

9. In the process of preparing tetraethyllead by reacting sodium-lead alloy and ethyl chloride, and recovering tetraethyllead from the products of reaction, the step of steam distilling tetraethyllead therefrom in the presence of an aqueous solution of a nitrate of iron containing iron equivalent to from 0.06 to 0.12 weight per cent of the lead contained in the products of reaction.

IVAR T. KROHN.

REFERENCES CITED

The following references are of record in the file of this patent:

UNITED STATES PATENTS

| Number | Name | Date |
| --- | --- | --- |
| 2,004,160 | Downing et al. | June 11, 1934 |
| 2,038,704 | Bake et al. | Apr. 28, 1936 |

FOREIGN PATENTS

| Number | Country | Date |
| --- | --- | --- |
| 214,221 | Great Britain | July 22, 1925 |